UNITED STATES PATENT OFFICE.

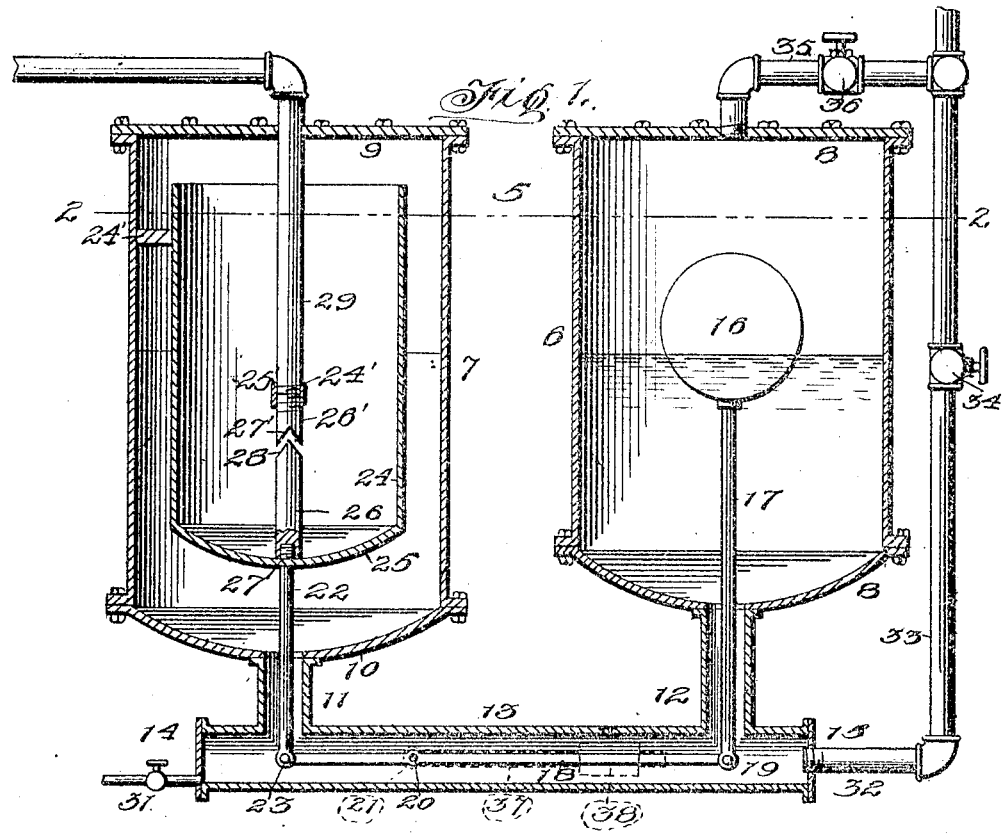
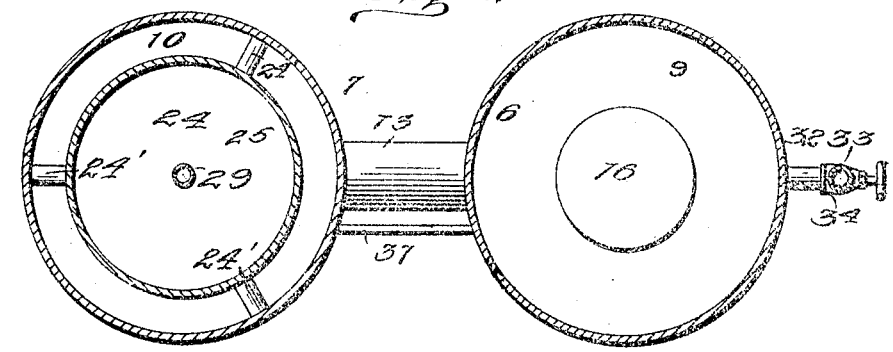

JAMES M. SHUMATE, OF FOREST CITY, MISSOURI.

STEAM-TRAP.

No. 892,766.

Specification of Letters Patent.

Patented July 7, 1908.

Application filed October 26, 1907. Serial No. 399,355.

*To all whom it may concern:*

Be it known that I, JAMES M. SHUMATE, a citizen of the United States, residing at Forest City, in the county of Holt and State of Missouri, have invented certain new and useful Improvements in Steam-Traps, of which the following is a specification.

This invention relates to steam traps and has for its object to construct a trap of this character having its outlet valve located at a point separate from the inlet.

A further object of this invention is to construct a trap of this character without the use of the usual steam joints, and to provide means whereby steam may enter the trap from the top or bottom thereof.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a vertical longitudinal sectional view of the present trap, and Fig. 2 is a horizontal sectional view on the line 2—2 of Fig. 1.

Referring now more particularly to the drawings, there is shown a steam trap 5, and this trap consists of the tanks 6 and 7 respectively, as shown. The bottom of the tank 6 is arranged at a greater elevation than the bottom of the tank 7. The tank 6 is provided with heads 8, and these heads are bolted or otherwise secured to the tank. The tank 7 is provided with similar heads 9 and 10 which are also bolted to the tank. The tanks 6 and 7 respectively are each provided with vertically extending pipes 11 and 12, and these pipes are connected to a horizontally disposed pipe 13, and this pipe is closed at its ends by heads 14 and 15.

A float 16 is arranged within the tank 6, and this float is connected to a depending rod 17. The rod 17 extends through the pipe 12, and as shown, this rod has its lower end disposed within the pipe 13. A rod 18 is arranged in the pipe 13, and this rod is pivotally connected with the rod 17 as shown at 19. The rod 18 is pivotally mounted upon the stem 20 which extends through the pipe 13 and through glands 21 which are carried thereby. A vertically extending rod 22 is pivoted as at 23 to the rod 18, and this rod is arranged within the pipe 11, and as shown, this rod is connected to a vertically movable chamber 24. Lugs 24' are arranged within the tank 7 and these lugs are thus arranged to guide the chamber 24 in its movement. The chamber 24 is closed at its lower end by a head 25, and the upper end of this chamber is open, as shown. The head 25 is provided with an upwardly extending finger 26 which has its lower end removably engaged with the head by a threaded connection as shown at 27, and the upper end of this finger is beveled as at 28 to form a valve. An outlet pipe 29 is disposed within a passage in the top of the tank 7, and this pipe extends downwardly and within the chamber 24. The lower end of this pipe is threaded as shown at 24', and this threaded end of the pipe is thus arranged to receive the threaded end 25' of a valve seat 26'. The seat 26' has its lower end beveled as shown at 27', and this end of the seat is thus arranged to receive the beveled portion 28 of the finger 26.

A blow off valve 31 is located at one end of the pipe 13 and adjacent the tank 7, as shown. The opposite end of the pipe 13 is connected with a pipe 32, and this pipe extends upwardly and adjacent the tank 6 as shown at 33, and in this portion of the pipe, there is provided a globe valve 34. A pipe 35 connects the portion 33 of the pipe 27 with the upper end of the tank 6, and this pipe is provided with a globe valve 36.

A lever 37 is connected to the stem 20 outside of the gland 21, and this lever is provided with an adjustable weight at its lower end, as shown at 38.

It will thus be seen that the valve 26 remains closed until water within the tank 6 rises, and in this movement of water within the tank, the float 16 will be carried upwardly to operate the rod 17, and upon operation of this rod, the rod 13 will be swung on its pivot to lower the chamber 24. After lowering of this chamber 24, the valve 26 will be removed from the outlet pipe 29, and the pressure of steam behind the water will force the water into the chamber 24 and out through the discharge pipe. After this operation, the float 16 with the aid of the weighted lever 37 will seek its normal position, and upon this action of the float, the valve 26 will be carried upwardly to close the pipe 29. By reason of the fact that the bottom of the tank 6 is arranged at an elevation higher than the bottom of the tank 7, it will be seen that water will be allowed to fill the chamber 24 before the float 16 is operated upon. The location of the outlet pipe 29 in a separate tank from the inlet thus allows water to be discharged without the waste of steam. The provision of the valves 34 and 36 respectively provides means whereby steam may enter the tank 6 from the top or bottom as may be found most desirable.

What is claimed is:

1. A steam trap comprising an inlet and an outlet tank, the inlet tank having a float, the outlet tank having a vertically movable chamber and arranged to receive water from the outlet tank, a valve carried by the vertically movable chamber, and connections between the float and the vertically movable chamber for controlling the valve.

2. A steam trap comprising an inlet tank and an outlet tank, the inlet tank having a float, a vertically movable chamber arranged in the outlet tank, a valve carried by said vertically movable chamber, connections between the float and the vertically movable chamber for operation of the valve and weighted means carried by said connections between the float and vertically movable chamber and arranged to assist in the operation of said valve.

In testimony whereof I affix my signature, in presence of two witnesses.

JAMES M. SHUMATE.

Witnesses:
  GEORGE W. LEASE,
  O. C. PLUMMER.